(No Model.)

C. F. McGLASHAN.
ICE PALACE.

No. 565,175. Patented Aug. 4, 1896.

Witnesses,
Jessie C. Brodie.
H. F. Ascheck

Inventor
Charles F. McGlashan
by Dewey & Co.
Attys.

UNITED STATES PATENT OFFICE.

CHARLES FAYETTE McGLASHAN, OF TRUCKEE, CALIFORNIA.

ICE PALACE.

SPECIFICATION forming part of Letters Patent No. 565,175, dated August 4, 1896.

Application filed March 23, 1896. Serial No. 584,426. (No model.)

*To all whom it may concern:*

Be it known that I, CHARLES FAYETTE McGLASHAN, a citizen of the United States, residing at Truckee, county of Nevada, State of California, have invented an Improvement in Ice Palaces; and I hereby declare the following to be a full, clear, and exact description of the same.

My invention relates to an improvement in the method of constructing ice palaces and similar structures.

It consists in details of construction which will be more fully explained by reference to the accompanying drawings, in which—

Figure 1:
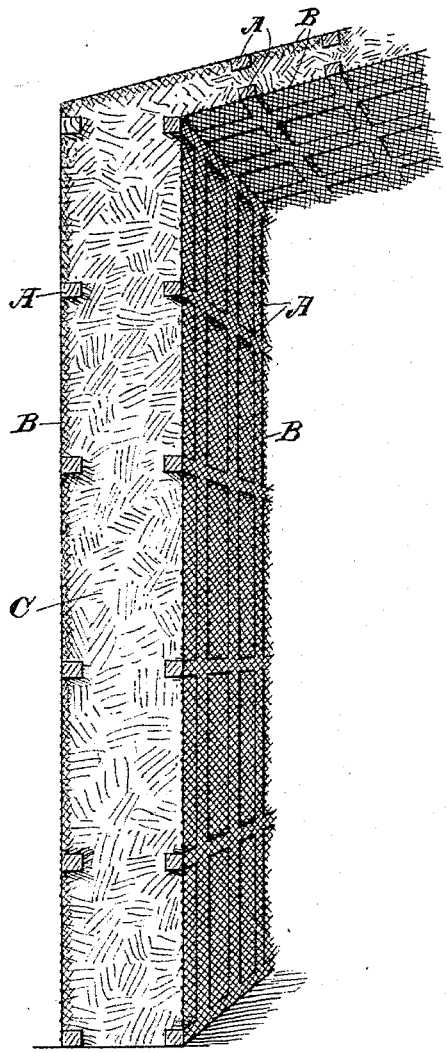
Figure 2:
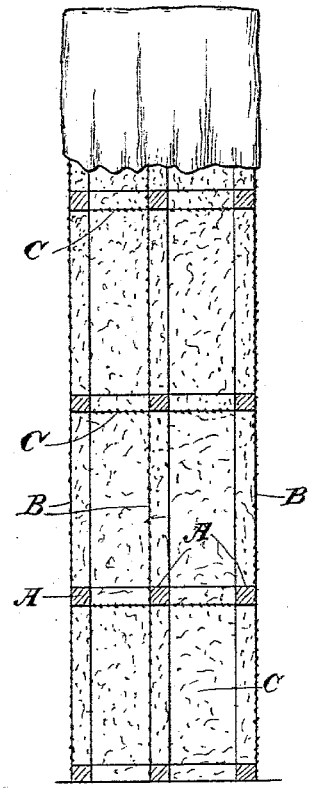

Figure 1 shows a portion of the skeleton frame ready for freezing. Fig. 2 is a section of a wall, the upper portion of which is shown in its complete frozen form.

Instead of building such structures with blocks of ice, as in the ordinary method, I erect two or more parallel walls of wood or metal, covered with wire-netting or other suitable material, and fill the space between these walls with some substance calculated to retard the dripping or percolation of water through the mass. By dripping, pouring, or spraying water upon these walls and the interior substance, I speedily secure solid walls of ice.

In carrying out my invention, I construct a double framework A A of any rough scantling or metal, which, when completed, forms the skeleton of an ice palace of any desired form or design. The distance between the outer and inner walls of this framework will be, say, two, four, or six feet, or any desired distance. I then cover the outer and inner walls with any suitable material, preferably wire-netting B. The space between this netting is then filled from bottom to top with brush, sticks, shavings, excelsior, masses of wire, horizontal partitions of wire-netting C, or anything which will loosely fill the space and impede the flow of water. Finally, whenever the temperature is below freezing, I pour water down through the loose material and along the sides of the netting, and the stream becoming greatly subdivided will drip from fiber to fiber or from wire to wire, and form a solid wall of ice two, four, or six feet wide, as the case may be. Water can be sprayed through the interstices of the wire or other covering of the framework and be poured or allowed to leak or drip down from the top or along the sides until the interior is not only a solid body of ice, but forms a foundation for additional masses of ice to form along the netting and on the outside until the structure becomes, to all appearances, a mass of solid ice, the framework and netting being completely hidden.

Two or more parallel walls of wire-netting attached to a skeleton framework of scantling or metal, with a filling of fibrous or other loose material, the whole to be kept sprayed or wet with water until it freezes, give an ice palace of any desired height, form, or design, which becomes in one or two cold nights or days far more substantial than a palace of block-ice. Such a framework is inconceivably lighter than blocks of ice and can be constructed in more fantastic and artistic shapes and with more ornamentation than is possible with blocks of ice. The palace can be carried to greater heights and permits of more imposing styles of architecture.

Ordinary ice palaces cannot be effected until there has been sufficient cold weather to freeze ice of the required thickness, say fourteen inches or two feet; but in the structure I propose, at any time when the thermometer is low, say at or below zero, the water turned in at the top, or thrown in at the sides by means of hose or pipes, drips slowly down from obstruction to obstruction and readily forms a mass of icicles which speedily unite into one compact body of ice, and the palace is completed long before block-ice could be secured from river, pond, or lake.

When thawing weather comes, ice palaces made of block-ice are irretrievably and permanently damaged, the crushing strength of the ice blocks greatly lessened, the beauty of the structure impaired beyond redress, and the entire building becomes unsafe without the possibility of repair. In my invention a thaw does no harm which cannot be easily repaired by the first cold night, the building becoming as strong, safe, and beautiful as before.

A principal advantage in connection with the durability of the proposed ice palace is the vastly-increased thickness which may be given to the walls. If the interior filling of the walls is brush or some such cheap material, there is no reason why the walls may not be six feet in thickness, or there may be several parallel walls of any thickness. The life of such an ice palace might therefore be prolonged to months instead of weeks, as in the present method.

The ordinary method possesses the advantage of having regular symmetrical blocks, but this is more than counterbalanced by the greater height attainable and the additional beauty and spectacular display afforded by the myriads of icicles which form on the sides of my proposed structure. Indeed, if my palace were called a "frost palace" instead of an "ice palace," it would be a more appropriate name, for it is, when completed, a mass of crystal pendants and frost frettings which is indescribably more beautiful than plain blocks of ice.

Lastly, the ordinary ice palace is without a roof, or if roofed at all is covered with a conventional roof of metal, glass, or similar material. I claim that a roof can be constructed exactly as the sides are, with double walls of netting filled with loose material, which, when sprayed or covered with water, will form with the sides one continuous block of ice, comprising sides, roof-turrets, towers, and all. The ice is self-supporting, and so long as there are ten or twelve inches of ice on sides and roof there is no possible danger of the roof crushing in. Arches, on the same principle, can be formed without keystones. The frozen mass forms one continuous keystone.

Having thus described my invention, what I claim as new, and desire to secure by Letters Patent, is—

1. An ice palace or building comprising a structure or framework formed with interstices and a mass of ice filling said interstices.

2. The method of constructing ice palaces or buildings which consists, essentially, in constructing a framework with an interior filling of filiform or open material and then spraying or distributing water through and over the same in a freezing temperature to produce a frozen solid body.

3. An ice palace or structure consisting of a framework comprising parallel walls of permanent open-work material, an intermediate filling of filiform or open material and a mass of ice inclosing the walls and filling and supported thereby.

In witness whereof I have hereunto set my hand.

CHARLES FAYETTE McGLASHAN.

Witnesses:
S. H. NOURSE,
JESSIE C. BRODIE.